(12) United States Patent
Emig et al.

(10) Patent No.: US 8,139,195 B2
(45) Date of Patent: Mar. 20, 2012

(54) FIELD EFFECT MODE ELECTRO-OPTICAL DEVICE HAVING A QUASI-RANDOM PHOTOSPACER ARRANGEMENT

(75) Inventors: David M. Emig, Trenton, IL (US); Chien-Hui Wen, Vernon Hills, IL (US); Zhiming Zhuang, Kildeer, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1125 days.

(21) Appl. No.: 11/959,999

(22) Filed: Dec. 19, 2007

(65) Prior Publication Data

US 2009/0161059 A1    Jun. 25, 2009

(51) Int. Cl.
*G02F 1/1339* (2006.01)
*G02F 1/1333* (2006.01)

(52) U.S. Cl. .......... 349/155; 349/110
(58) Field of Classification Search .......... 349/86–88, 349/155–156, 110
See application file for complete search history.

(56) References Cited

U.S. PATENT DOCUMENTS

| | | |
|---|---|---|
| 3,915,548 A | 10/1975 | Opittek et al. |
| 4,017,848 A | 4/1977 | Tannas, Jr. |
| 4,078,257 A | 3/1978 | Bagley |
| 4,462,924 A | 7/1984 | Raynes |
| 4,500,173 A | 2/1985 | Leibowitz et al. |
| 4,545,648 A | 10/1985 | Shulman et al. |
| 4,893,903 A | 1/1990 | Thakar et al. |
| 5,121,234 A | 6/1992 | Kucera |
| 5,225,818 A | 7/1993 | Lee et al. |
| 5,231,381 A | 7/1993 | Duwaer |
| 5,376,948 A | 12/1994 | Roberts |
| 5,600,459 A | 2/1997 | Roy et al. |
| 5,796,454 A | 8/1998 | Ma |
| 5,818,615 A | 10/1998 | Abileah et al. |
| 6,047,196 A | 4/2000 | Makela et al. |
| 6,058,164 A | 5/2000 | Ibuka et al. |
| 6,144,359 A | 11/2000 | Grave |
| 6,150,962 A | 11/2000 | Rossmann |
| 6,188,379 B1 | 2/2001 | Kaneko |
| 6,211,931 B1 | 4/2001 | Fukao et al. |

(Continued)

FOREIGN PATENT DOCUMENTS

EP    1341029    9/2003

(Continued)

OTHER PUBLICATIONS

""Palm Treo 650 Cell Phone" (Lets Talk catalog web site as of 2006)", http://web.archive.org/web/20060313154345/www.letstalk.com/product/product.htm?prid=27762.

(Continued)

*Primary Examiner* — Ding T. Nguyen (57) ABSTRACT

A segmented optical shutter (200) is used with a high-resolution display (101) to provide a dynamic user interface (400) for a portable electronic device (100). To reduce optical interference corresponding to a correlation function for transmitted light occurring between the photospacers (209) in the segmented optical shutter (200) and the black matrix (107), the photospacers (209) are disposed along a light transmitting substrate (204) of the segmented optical shutter (200) in a quasi-random arrangement. The quasi-random arrangement, which may include varying the horizontal and vertical placement of the photospacers (209), repeating asymmetrical subsections of photospacer configurations, varying the size or shape of the photospacers (209), or combinations thereof, misaligns the photospacers (209) relative to the black matrix (107) or other elements to reduce optical interference and moiré patterns that may otherwise be perceptible to a user.

19 Claims, 5 Drawing Sheets

U.S. PATENT DOCUMENTS

| | | | |
|---|---|---|---|
| 6,243,080 B1 | 6/2001 | Molne | |
| 6,271,835 B1 | 8/2001 | Hoeksma | |
| 6,310,609 B1 | 10/2001 | Norgenthaler | |
| 6,325,424 B1 | 12/2001 | Metcalfe | |
| 6,327,376 B1 | 12/2001 | Harkin | |
| 6,574,044 B1 | 6/2003 | Sahouani et al. | |
| 6,574,487 B1 | 6/2003 | Smith et al. | |
| 6,646,697 B1 | 11/2003 | Sekiguchi et al. | |
| 6,662,244 B1 | 12/2003 | Takahashi | |
| 6,704,004 B1 | 3/2004 | Ostergård et al. | |
| 6,768,481 B2 | 7/2004 | Ozawa et al. | |
| 6,768,586 B2 | 7/2004 | Sahouani et al. | |
| 6,813,957 B1 | 11/2004 | Platz | |
| 6,819,316 B2 | 11/2004 | Schulz et al. | |
| 6,819,380 B2 | 11/2004 | Wen et al. | |
| 6,842,170 B1 | 1/2005 | Akins et al. | |
| 6,864,945 B2 * | 3/2005 | Fujimori et al. | 349/156 |
| 6,914,874 B2 | 7/2005 | Kondo | |
| 6,968,744 B1 | 11/2005 | Silverbrook et al. | |
| 7,106,517 B2 | 9/2006 | Olczak | |
| 7,123,945 B2 | 10/2006 | Kokubo | |
| 7,127,705 B2 | 10/2006 | Christfort et al. | |
| 7,139,114 B2 | 11/2006 | Schmitz et al. | |
| 7,180,672 B2 | 2/2007 | Olczak | |
| 7,191,150 B1 | 3/2007 | Shao et al. | |
| 7,345,671 B2 | 3/2008 | Robbin et al. | |
| 2002/0090980 A1 | 7/2002 | Wilcox et al. | |
| 2002/0123946 A1 | 9/2002 | Haworth et al. | |
| 2002/0123962 A1 | 9/2002 | Bryman et al. | |
| 2003/0020999 A1 | 1/2003 | Tsujimura et al. | |
| 2003/0025679 A1 | 2/2003 | Taylor et al. | |
| 2003/0054867 A1 | 3/2003 | Dowlat et al. | |
| 2003/0058223 A1 | 3/2003 | Tracy et al. | |
| 2003/0161093 A1 | 8/2003 | Lam et al. | |
| 2004/0036680 A1 | 2/2004 | Davis et al. | |
| 2004/0058718 A1 | 3/2004 | Yu | |
| 2004/0073504 A1 | 4/2004 | Bryman et al. | |
| 2004/0104826 A1 | 6/2004 | Philipp | |
| 2004/0189591 A1 | 9/2004 | du Breuil | |
| 2004/0218121 A1 | 11/2004 | Zhuang et al. | |
| 2004/0246580 A1 | 12/2004 | Shahouani et al. | |
| 2004/0265602 A1 | 12/2004 | Kobayashi et al. | |
| 2005/0007339 A1 | 1/2005 | Sato | |
| 2005/0020316 A1 | 1/2005 | Mahini | |
| 2005/0020325 A1 | 1/2005 | Enger et al. | |
| 2005/0030048 A1 | 2/2005 | Bolender et al. | |
| 2005/0030292 A1 | 2/2005 | Diederiks | |
| 2005/0064913 A1 | 3/2005 | Kim | |
| 2005/0088417 A1 | 4/2005 | Mulligan | |
| 2005/0093767 A1 | 5/2005 | Lu et al. | |
| 2005/0114825 A1 | 5/2005 | Leung et al. | |
| 2005/0134549 A1 | 6/2005 | Kamiya et al. | |
| 2005/0171901 A1 | 8/2005 | Rosenblatt et al. | |
| 2005/0243069 A1 | 11/2005 | Yorio et al. | |
| 2005/0264190 A1 | 12/2005 | Park et al. | |
| 2005/0266891 A1 | 12/2005 | Mullen | |
| 2006/0038937 A1 | 2/2006 | Kaneko et al. | |
| 2006/0046792 A1 | 3/2006 | Hassemer et al. | |
| 2006/0080236 A1 | 4/2006 | Welker et al. | |
| 2006/0161870 A1 | 7/2006 | Hotelling et al. | |
| 2006/0161871 A1 | 7/2006 | Hotelling | |
| 2006/0166702 A1 | 7/2006 | Dietz et al. | |
| 2006/0197753 A1 | 9/2006 | Hotelling | |
| 2006/0266640 A1 | 11/2006 | Halsey et al. | |
| 2006/0277472 A1 | 12/2006 | Yodo et al. | |
| 2006/0277478 A1 | 12/2006 | Seraji et al. | |
| 2006/0290871 A1 | 12/2006 | Harada | |
| 2007/0030438 A1 | 2/2007 | Chiang | |
| 2007/0052689 A1 | 3/2007 | Tak | |
| 2007/0075965 A1 | 4/2007 | Huppi et al. | |
| 2007/0097595 A1 | 5/2007 | Radivojevic et al. | |
| 2007/0152983 A1 | 7/2007 | McKillop et al. | |
| 2007/0164986 A1 | 7/2007 | Jeong et al. | |
| 2007/0273662 A1 | 11/2007 | Lian et al. | |
| 2008/0122796 A1 | 5/2008 | Jobs et al. | |
| 2008/0169944 A1 | 7/2008 | Howarth et al. | |
| 2008/0204417 A1 | 8/2008 | Pierce et al. | |
| 2008/0204463 A1 * | 8/2008 | Cybart et al. | 345/520 |
| 2008/0211734 A1 | 9/2008 | Huitema et al. | |
| 2008/0309589 A1 | 12/2008 | Morales | |
| 2008/0316397 A1 * | 12/2008 | Polak et al. | 349/97 |

FOREIGN PATENT DOCUMENTS

| | | |
|---|---|---|
| EP | 1467536 | 10/2004 |
| GB | 2359178 | 8/2001 |
| JP | 03-180920 | 8/1991 |
| JP | 08-063271 | 3/1996 |
| JP | 2002-049461 | 2/2002 |
| JP | 2003-101622 | 4/2003 |
| JP | 2005-100186 | 4/2005 |
| JP | 2005352987 | 12/2005 |
| JP | 2006-091486 A | 4/2006 |
| JP | 2006-243658 A | 9/2006 |
| JP | 2006-284757 A | 10/2006 |
| KR | 10-1998-0026397 | 7/1998 |
| KR | 20-0225646 | 6/2001 |
| KR | 10-2004-0019677 | 3/2004 |
| KR | 100652767 | 11/2006 |
| KR | 10-2006-0134659 | 12/2006 |
| KR | 10-2007-0109603 | 11/2007 |
| WO | WO-01/13209 | 2/2001 |
| WO | WO-03-104884 | 12/2003 |
| WO | WO-03-104884 A2 | 12/2003 |
| WO | WO-2006/094308 | 9/2006 |
| WO | WO-2006/116145 | 11/2006 |
| WO | WO-2006/123294 | 11/2006 |
| WO | WO-2007/063809 A1 | 6/2007 |

OTHER PUBLICATIONS

Tsvey, Gennadiy "Non-Final Office Action", U.S. Appl. No. 11/684,454, mailed Nov. 9, 2009.

Tsvey, Gennadiy "Non-Final Office Action", U.S. Appl. No. 11/684,476, mailed Oct. 9, 2009.

Joseph, Dennis P., "Non-Final Office Action Mailed Nov. 13, 2009", U.S. Appl. No. 11/679,233, filed Feb. 27, 2007, First Inventor Adam Cybart.

Walthall, Allison N., "Non-Final Office Action", U.S. Appl. No. 11/766,921, Fled Jun. 22, 2007, Mailed Jan. 27, 2010.

Moorad, Waseem "Final Office Action", U.S. Appl. No. 11/751,175, filed May 21, 2010, Mailed Dec. 9, 2010.

Schneider, Michael "PCT Search Report and Opinion", Date of search: May 3, 2010 Date mailed: May 11, 2010 Filed: 08728978.1-2224/2115555.

Joseph, Dennis P., et al., "Non-Final Office Action", U.S. Appl. No. 11/679,233, filed Feb. 27, 2007 First Inventor: Adam Cybart Mailed: Feb. 2, 2011.

Schnirel, Andrew B., "Non-Final Office Action", U.S. Appl. No. 11/679,228, filed Feb. 27, 2007, Adam Cybart, inventor, Mailed Mar. 10, 2010.

Joseph, Dennis "Final Office Action", U.S. Appl. No. 11/679,233, filed Feb. 27, 2007, Adam Cybart et al., inventors, Mailed Apr. 29, 2010.

Moorad, Waseem "Non-Final Office Action", U.S. Appl. No. 11/751,175, filed May 21, 2007, David S. Brenner, inventor, Mailed May 19, 2010.

Hegarty, Kelly B., "Non-Final Office Action", U.S. Appl. No. 11/762,481, filed Jun. 13, 2007, Joseph M. Morales, inventor, Mailed May 14, 2010.

Walthall, Allison N., "Final Office Action", U.S. Appl. No. 11/766,921, filed Jun. 22, 2007, Robert D. Polak, inventor, Mailed May 18, 2010.

Tsvey, Gennadiy "Final Office Action", U.S. Appl. No. 11/684,476, filed Mar. 9, 2007, Paul M. Pierce, inventor, Mailed May 25, 2010.

Sitta, Grant "Final Office Action", U.S. Appl. No. 11/741,877, filed Apr. 30, 2010, XiaoPing Bai first inventor, Mailed Jun. 2, 2010.

Tsvey, Gennadiy "Final Office Action", U.S. Appl. No. 11/684,454, filed Mar. 9, 2007, Paul M. Pierce, first inventor, Mailed May 28, 2010.

Marinelli, Patrick "Non-Final Office Action", U.S. Appl. No. 11/836,973, filed Aug. 10, 2007, Paul M. Pierce, first inventor, Mailed Aug. 17, 2010.

Sony Operation Guide, Publication Date Unknown.

Hegarty, Kelly "Final Office Action", U.S. Appl. No. 11/762,481, filed Jun. 13, 2007, Joseph M. Morales, first inventor, Mailed Oct. 13, 2010.
Schnirel, Andrew "Final Office Action", U.S. Appl. No. 11/679,228, flied Feb. 27, 2007, Adam Cybart, first inventor, Mailed Oct. 28, 2010.
Edwards, Carolyn R., "First Office Action", First inventor: Paul Pierce Filing Date: Aug. 9, 2007 U.S. Appl. No. 11/836,616 Mail date: Nov. 23, 2010.
"Wikipedia.org Ã?? Liquid Crystal Display", http://en.wikipedia.org/wiki/Liquid_crystal_display.
http://www.enqadqet.com/2006/01/04/pioneer-unveils-inno-xm2go-portable-.xm-radio-mp3-player/.
http://www.apple.com/itunes/mobile/.
http://www.mobiledia.com/phones/samsung/sgh-t509.html.
Banarjea, Robin "PCT Search Report and Opinion", PCT application: PCT/US2008/071674; International Filing Date: Jul. 31, 2008; Applicant: Motorola, Inc.; Date of mailing: Jan. 4, 2011; Priority date: Aug. 10, 2007.
Qi, Zhi Q., "Notice of Allowance", U.S. Appl. No. 11/838,061, filed Aug. 13, 2007, mailed Apr. 11, 2011.
Hegarty, Kelly "Non-Final Office Action", U.S. Appl. No. 11/762,481, filed Jun. 13, 2007.
Qi, Zhi Q., "Notice of Allowance", U.S. Appl. No. 11/838,061, filed Aug. 13, 2007, mailed Aug. 9, 2011.
Walthall, Allison "Non-Final Office Action", U.S. Appl. No. 12/470,957, filed May 22, 2009, Mailed Oct. 12, 2011.

* cited by examiner

FIELD EFFECT MODE ELECTRO-OPTICAL DEVICE HAVING A QUASI-RANDOM PHOTOSPACER ARRANGEMENT

BACKGROUND

1. Technical Field

This invention relates generally to a field effect mode electro-optical device, such as a twisted nematic liquid crystal device, and more particularly to a field effect mode electro-optical device having photospacers that are arranged in an a quasi-random arrangement so as to minimize optical interference with other optical components in a system.

2. Background Art

Copending, commonly assigned U.S. application Ser. No. 11/684,454, entitled "Multimodal Adaptive User Interface for a Portable Electronic Device," teaches a multimodal electronic device that employs a segmented optical shutter enabled dynamic keypad. The segmented optical shutter, which in one embodiment is a twisted nematic liquid crystal display, is used for presenting one of a plurality of keypad configurations to a user. Electric fields are applied to the segmented optical shutter, thereby changing the optical properties of the segments of the optical shutter to hide and reveal various user actuation targets. Additionally, a high-resolution display can be hidden from the user when the device is OFF, yet revealed when the device is ON. The application of the electric field causes the polarity of light passing through the optical shutter to rotate, thereby opening or closing segments or windows.

While this invention works well in practice, in some configurations the physical properties of the high-resolution display being used can cause optical interference that is visible to a user. For instance, where the segmented optical shutter is used to hide and reveal the high-resolution display, which can be a pixilated liquid crystal display, the optical shutter is disposed atop the high-resolution display. Liquid crystal displays are thin-film transistor devices and include an inherent "black matrix" that is formed by the opaque boundaries of each pixel. While these boundaries are not visible at a distance, they can be seen upon close examination. Further, non-optical elements such as capacitors, electrical traces, and semiconductor materials may also form small, opaque patterns or regions.

Some optical shutter devices use photolithographically deposited spacers ("photospacers"), spread apart in equal periodic patterns, rows, or columns to keep the substrates of the optical shutter from touching. When the photospacers of the optical shutter sufficiently coincide with the opaque regions or black matrix of the pixilated liquid crystal device, optical interference can occur. In some cases a moiré pattern may appear to the user. While this condition happens infrequently and only when certain, somewhat unlikely conditions occur simultaneously, when it does occur, it can be distracting to a user.

There is thus a need for an improved optical shutter device that reduces optical interference with other system components when used in an optical system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A. Further, it is expected that one of ordinary skill, notwithstanding possibly significant effort and many design choices motivated by, for example, available time, current technology, and economic considerations, when guided by the concepts and principles disclosed herein will be readily capable of generating embodiments of the invention with minimal experimentation.

Embodiments of the invention provide an optical shutter device, such as a twisted nematic field effect mode electro-optical device, in which the photospacers used to separate the substrates about the electro-optical material are arranged quasi-randomly. The quasi-random arrangement of photospacers helps to reduce optical interference that may occur when the optical shutter is used with other devices having regular or periodically spaced optical elements. For instance, where the optical shutter is a twisted nematic liquid crystal layer being used in conjunction with a pixilated liquid crystal device having a black matrix, the quasi-random arrangement helps to reduce the correlation function for transmitted light occurring between the photospacers and the black matrix.

The quasi-random arrangement of photospacers may take many forms. In one embodiment, for example, a quasi-random arrangement may be achieved by repeating a pattern of triangles (or other shapes) of photospacers such that no two triangles overlap. In another embodiment, the quasi-random arrangement is achieved by adjusting the horizontal and vertical location of each photospacer by a random percentage within a fixed range, where the range is fixed such that no two photospacers overlap. By way of example, the horizontal position of each photospacer and the vertical position of each photospacer may be altered by a predetermined distance multiplied by a random number selected from a given range.

In another embodiment, the quasi-random arrangement may be achieved by altering the size or shape of each photospacer, perhaps in conjunction with altering the location of each photospacer. The use of the quasi-random arrangement works to reduce optical interference while maintaining the reliability and necessary spacing of the gap between substrates about the optical shutter active material. Not only is the quasi-random arrangement of photospacers a low-cost solution to the optical interference issue, it offers a robust solution in that the optical performance of the overall system is not significantly affected as each of the photospacers is irresolvable to the unaided human eye.

Figure 1:
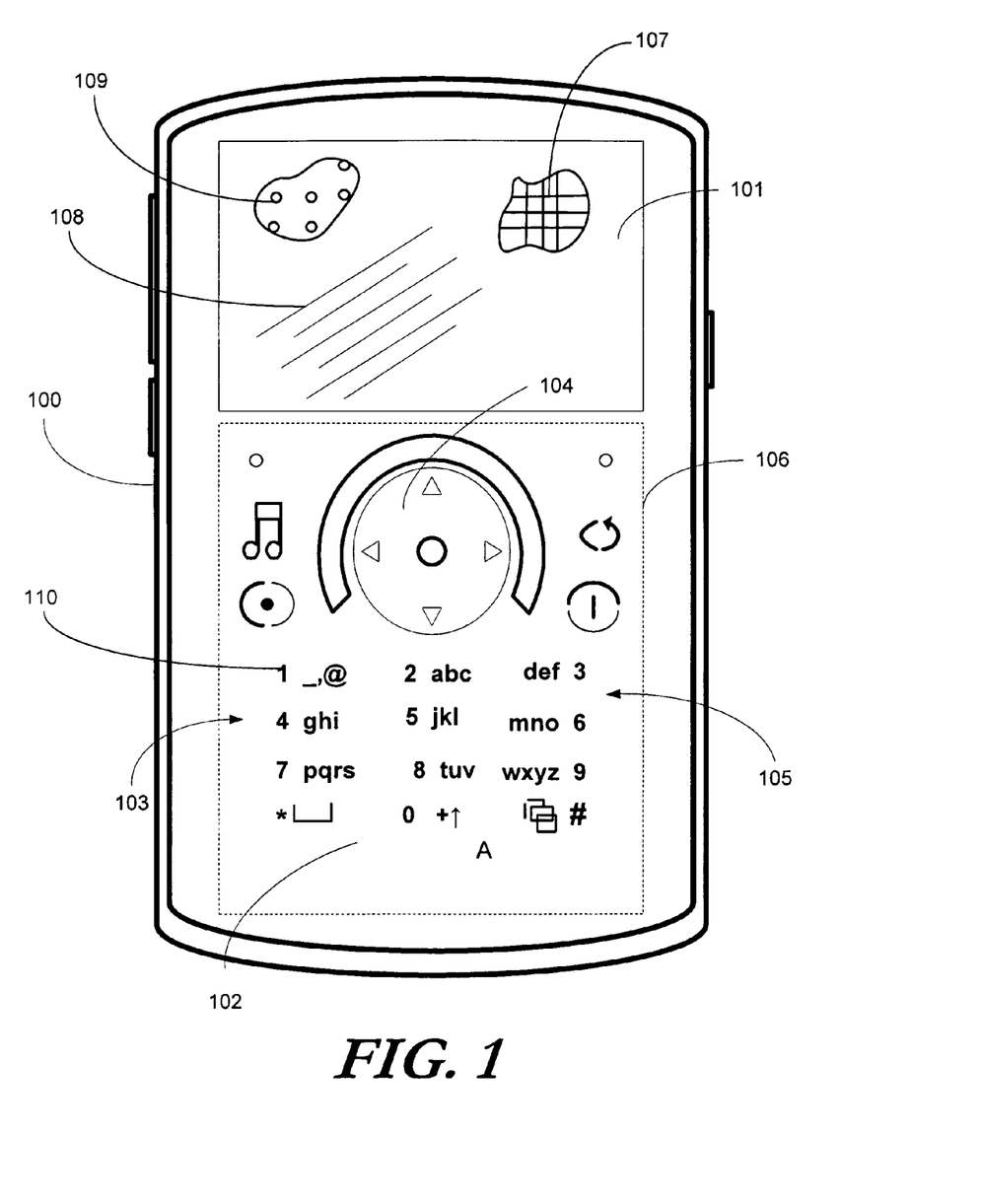
FIG. 1 illustrates an electronic device having a dynamic user interface.

Turning now to FIG. 1, illustrated therein is portable electronic device 100 comprising a high-resolution display 101 and a field effect mode electro-optical device that is configured to operate as a segmented optical shutter 102. The high-resolution display 101 and segmented optical shutter 102 work in tandem to form a dynamic user interface. In one embodiment for example, the segmented optical shutter 102 is configured to present a mode-based dynamic keypad 103 to a user by opening and closing segmented windows 107. The segmented windows 110 are opened and closed by an electric fields that are applied to pellucid, segmented electrodes disposed upon the substrates of the segmented optical shutter 102. The segmented windows 110 can be configured as alphanumeric keys or device symbols that are hidden or revealed when the segmented windows 110 are opened or closed. Further, a window may be placed atop the high-resolution display 101 such that it is hidden when the portable electronic device 100 is OFF and revealed when the portable electronic device 100 is ON.

The exemplary embodiment shown in FIG. 1 also includes a navigation device 104—shown here as a set of navigational elements including a multidirectional navigation key and rounded touch bar. In at least one embodiment, the touch bar extends at least partially around the multidirectional navigation key. The navigation device 104 is used, among other things, for navigating among different modes of the portable electronic device 100.

The high-resolution display 101, which in one embodiment is a pixilated liquid crystal display, is disposed beneath the segmented optical shutter 102 and is configured to present device information to the user. The term "high-resolution display" is used herein to refer to a device that can present text and images to a user by altering a large number of individually addressable pixels which, when viewed collectively by a user, form a composite image or text. Examples include a 256 pixel by 128 pixel reflective or backlit display, such as those manufactured by Samsung and Sony. Such high-resolution pixilated display devices, as noted above, generally include an inherent black matrix 107 formed by the opaque boundaries of each pixel cell. Further, other components, such as electrical traces, drive capacitors, or transistor materials may form periodic, non-transparent or semi-transparent structures.

Figure 2:
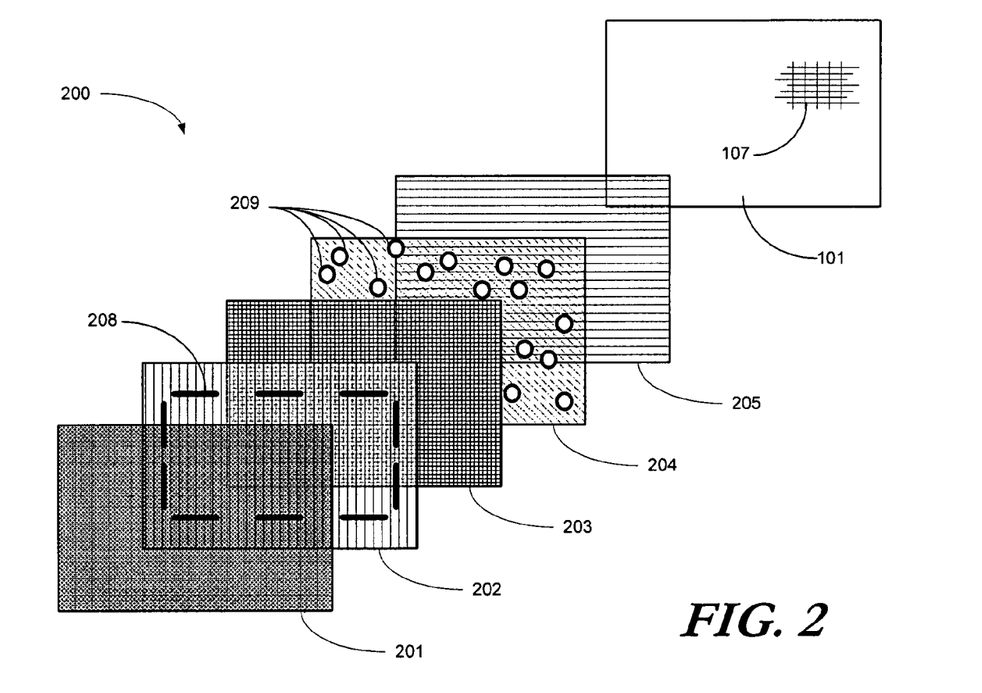
FIG. 2 illustrates an exploded view of a segmented optical shutter and a high-resolution display in accordance with embodiments of the invention.

As will be shown in more detail in the discussion of FIG. 2, the segmented optical shutter 102 includes two light transmitting substrates, between which a layer of material is disposed. Where the segmented optical shutter is a twisted nematic liquid crystal device for instance, a layer of twisted nematic material will be disposed between the substrates of the segmented optical shutter 102.

Photospacers 109 are used to ensure that the proper spacing between substrates is maintained across the segmented optical shutter 102. This spacing can impact the overall shuttering contrast, which is the luminous transmittance of the segmented optical shutter 102 with its segments open, divided by that when the segments are closed. In many applications it is desirable to keep this spacing consistent across the segmented optical shutter 102 so as to keep the shuttering contrast constant.

While each individual photospacer is generally not noticeable to the naked eye, the photospacers 109 do in fact block some light passing from the high-resolution display 101 to the user. Where the photospacers 109 are aligned in a correlated optical fashion with the black matrix 107, optical interference 108 can occur. This optical interference 108, which can appear as a moiré pattern, is due to the spatial interference between the black matrix 107 and the regular, equal photospacer arrangement, which is generally in linear rows and columns.

Embodiments of the present invention reduce or eliminate the optical interference by employing a quasi-random arrangement of photospacers in the optical shutter. The quasi-random arrangement helps to minimize a correlation function for transmitted light in the area where optical interference is to be eliminated, while still maintaining a consistent average photospacer height and pitch. The consistent height and pitch help to provide a constant separation between the substrates of the segmented optical shutter to provide a consistent shuttering contrast across the high-resolution display.

Turning now to FIG. 2 illustrated therein is one embodiment of a segmented optical shutter 200 and high-resolution display 101 for use as a user interface in accordance with the invention. In FIG. 2, a field effect mode electro-optical device is shown as the segmented optical shutter 200. For discussion purposes, this field effect mode electro-optical device will be described as a twisted nematic liquid crystal display device. The twisted nematic liquid crystal material is used an exemplary embodiment, as it will be obvious to those of ordinary skill in the art having the benefit of this disclosure that other materials or types of field effect mode electro-optical devices may also be used. Other materials include polymer-dispersed liquid crystal material, super twisted nematic liquid crystal material, ferro-electric liquid crystal material, electrically-controlled birefringent material, optically-compensated bend mode material, guest-host materials, and other types of materials using the same or other types of light modulating techniques.

FIG. 2 illustrates an exploded view of a twisted nematic liquid crystal display being used as the segmented optical shutter 200. The material used in the device is referred to as "twisted" because it contains liquid crystal elements that twist and untwist, in response to an applied electric field, in differing amounts. The twisting affects the polarization of light passing through the device.

A first light polarizer layer 201 is disposed on one side of the segmented optical shutter 200 to polarize incident light. A light transmitting substrate 202 then has indium tin oxide (or other pellucid material) electrodes disposed thereon in varying shapes. Each shape corresponds to the window that will be opened or closed. For instance, the windows can be shaped as alphanumeric characters or device symbols. Where the window is to reveal and hide the high-resolution display 101, the window 208 can be shaped to match the dimensions of the visible portion of the high-resolution display 101.

A layer of twisted nematic liquid crystal material 203 is then next, followed by another light transmitting substrate 204 configured with ground electrodes. As discussed above, the light transmitting substrates 202,204 are separated by photospacers 209, which are disposed along one, or both, light transmitting substrates 202,204. Note that for the purposes of discussion, the photospacers 209 are shown as being positive elements, i.e., each photospacer is shown as a bump or protrusion emanating from one or both of the light transmitting substrates 202,204. It will be obvious to those of ordinary skill in the art having the benefit of this disclosure that the invention is not so limited. An opposite, or "negative" configuration could also be used. Such a negative configuration may be created, for instance, by depositing a layer of semitransparent material, such as indium-tin oxide along one or both substrates 202,204 and then etching micro-holes periodically across the substrate. These "micro-holes" effectively form negative photospacers. However, they may still cause interference in that the micro-holes could transmit slightly more light than the semitransparent layer. In such an embodiment, the quasi-random distribution would apply to the micro-holes so as to eliminate interference. As such, the quasi-random arrangement described herein can apply to both positive and negative photospacer configurations.

For illustration purposes, the photospacers 209 are disposed along light transmitting substrate 204, although they could have equally been disposed along light transmitting substrate 202. The photospacers 209, which are generally on the order of a ten to fifteen micrometers in diameter and five to eight micrometers high, are generally translucent and can deposited on the light transmitting substrate 204 by photolithography, etching, or photo-deposition. Another light polarizer layer 205 then follows. The polarization axis orientation of the second light polarizer layer 205 is the same as that of the first polarizer layer 201. By electrically altering the twisted nematic liquid crystal material 203, the segmented optical shutter 200 can be used to selectively pass and block light.

Where no voltage is applied to the electrodes, the segmented optical shutter 200 is in a first state. When voltage is applied, the liquid crystal material twists—in incremental amounts up to 90 degrees—thereby changing the luminous polarization of light passing through the twisted nematic liquid crystal material 203. This twisted nematic liquid crystal material 203 thus acts as a controllable polarizer, controlled by electrical signals applied to the electrodes. Adjustment of the voltage being applied to the electrodes permits varying levels grey, as well as transparent states or pellucid states to be created.

As mentioned above, the high-resolution display 101 can include optical components like its black matrix 107. As most high-resolution display devices have pixels arranged in rows and columns, the black matrix 107 tends to be a tic-tac-toe board shape that runs across the high-resolution display 101.

To reduce, minimize, or eliminate optical interference with the black matrix 107, the photospacers 209 are disposed in a quasi-random arrangement on the light transmitting substrate 204. The quasi-random arrangement, as will be shown in subsequent figures, can include varying the placement locations of each photospacer 209 relative to the others, varying the shape or width of each photospacer 209, repeating an sub-pattern across the light transmitting substrate 204, or combinations thereof. The photospacers 209 are disposed quasi-randomly so as to reduce the periodic spatial optical interference that may occur between the photospacers 209 and the thin-film transistor elements of the pixilated, high-resolution display 101, including the black matrix 107.

Figure 3:
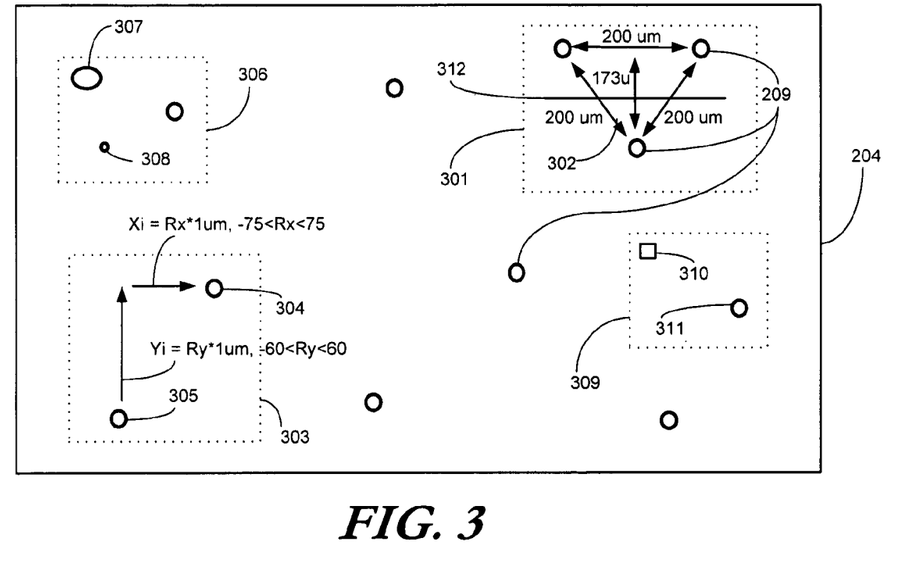
FIG. 3 illustrates a plan view of a light transmitting substrate used in a segmented optical shutter having photospacers disposed thereon in a quasi-random arrangement in accordance with embodiments of the invention.

Turning now to FIG. 3, illustrated therein is a plan view of one of the light transmitting substrates 204 that better illustrates various embodiments of quasi-randomly disposed photospacers 209. For simplicity, the single light transmitting substrate 204 of FIG. 3 illustrates several embodiments of quasi-random deposition. Embodiments of the invention, however, may use only one quasi-random spacing method. Two or more methods may be used as well.

The first two quasi-random arrangements of photospacers include arrangements of varying horizontal and vertical distances between each photospacer along the light transmitting substrate 204. One arrangement depends from a random number within a predetermined range, while the other includes repeating an arrangement of a subsection of photospacers that is uncorrelated with the black matrix (107). The other arrangements involve differing shapes and sizes of photospacers.

In a first region 301, the quasi-random arrangement of photospacers 209 comprises a repetition of triangular orientations 302 of photospacers. Each triangle, which may or may not be equilateral, is asymmetrical across axis 312.

By way of example, when using photospacers 209 having a constant diameter (9 um is one example), a periodic, quasi-random pattern of photospacers 209 may be created by repeating equilateral triangles across the light transmitting substrate 204. A distance of around 200 um, for instance, may be used between each photospacer 209. This repetition of equilateral triangles breaks the regular line and column pattern associated with prior art twisted nematic devices, and reduces—or eliminates—correlation with the black matrix (107) of the high-resolution display 101.

Other options are available as well, including using triangles across the light transmitting substrate 204 where the triangles differ in height and width. As such, some of the triangular orientations would differ in height and width from other triangular orientations. This also reduces the correlation between the black matrix (107) and the photospacers 209. When using the quasi-random arrangement, embodiments of the invention provide a means to arrange the photospacers 209 in a sufficiently uncorrelated manner relative to the black matrix (107) as to eliminate humanly perceptible optical interference between the plurality of photospacers and the black matrix (107).

In region 303, the quasi-random arrangement comprises locating at least some of the photospacers 304 relative to other photospacers 305, horizontally and vertically along the light transmitting substrate 204, by a random distance. In one embodiment, the random percentage is selected from a predetermined range such that no two photospacers overlap.

By way of example, again using a 9 um wide photospacer, photospacer 305 is placed on the light transmitting substrate 204. Each other photospacer may then be placed a multiple of 1 um from photospacer 305, where the multiple is based upon a random number within a predetermined range. Imagine that the range for horizontal placement spans non-zero integers from −75 to 75, and that the vertical placement range spans non-zero integers from −65 to 65. Where a random horizontal value of 40 and a random vertical value of 10 were selected, photospacer 304 would be placed 40 um horizontally and 10 um vertically, along the light transmitting substrate 204, from photospacer 305. The photospacers 304,305 are thus quasi-randomly arranged so as to reduce the correlation function for transmitted light occurring between the photospacers 304, 305 and the black matrix (107) or other thin film transistor elements within the segments of the segmented optical shutter (200). The quasi-random arrangement causes misalignment between the photospacers and the linear rows and columns of pixels or the corresponding linear rows and columns of the black matrix (107).

In region 306, various photospacers 307,308 have cross sectional areas that are different from each other. For instance, the diameter or cross sectional area of photospacer 307 is greater than that of photospacer 308. As such, the correlation function for transmitted light occurring between the photospacers 307,308 and the black matrix (107) or other thin film transistor elements within the segments of the segmented optical shutter (200) is again reduced.

In region 309, the photospacers 310,311 have different cross sectional areas. Photospacer 310 has an irregular shape, while photospacer 309 is rounded. This difference in photospacer shape again helps to reduce the correlation function between the photospacers 310,311 and the black matrix (107) or other thin film transistor elements.

Figure 4:
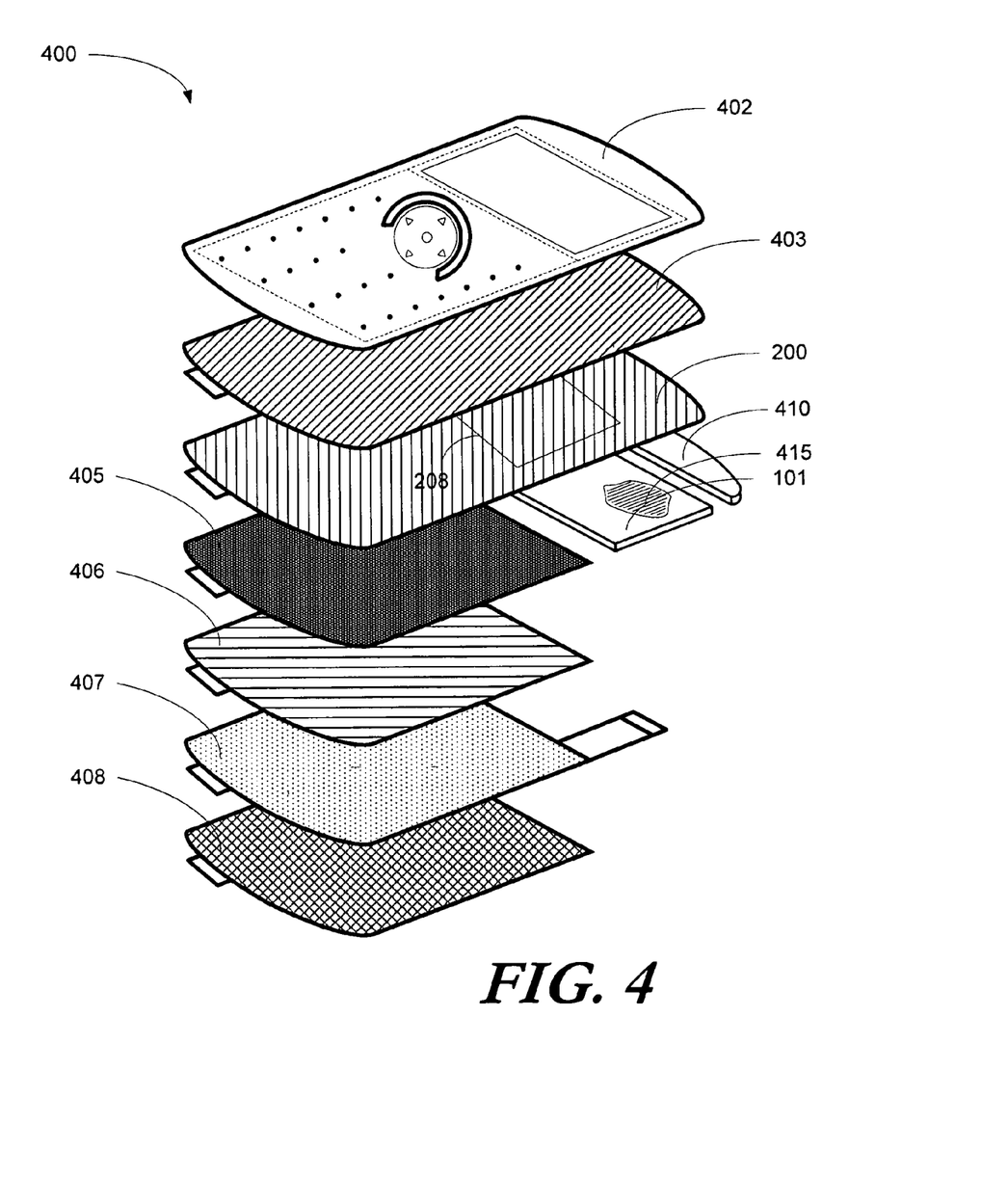
FIG. 4 illustrates an exploded view of a dynamic user interface in accordance with embodiments of the invention.

Turning now to FIG. 4, illustrated therein is an exploded view of one embodiment of a dynamic user interface 400 using both a field effect mode electro-optical device (segmented optical shutter 200) with photospacers disposed in a quasi-random arrangement, and a high-resolution display 101 in accordance with embodiments of the invention. The dynamic user interface 400 is suitable for use as the morphing user interface for the portable electronic device (100) of FIG. 1. The dynamic user interface 400 reduces or eliminates any optical interference occurring between the thin film transistor elements of the high-resolution display 101 and the segmented optical shutter 200 as the photospacers in the segmented optical shutter 200 are disposed with a quasi-random arrangement.

The segmented optical shutter 200 can be used as a field effect enabled liquid crystal dynamic keypad by selectively transitioning segments from opaque states to pellucid states, as described above. Further, the segmented optical shutter 200 can be used to hide and reveal the high-resolution display 101. For instance, in one embodiment the high-resolution display 101 (which may have its own lighting system and may also include a ultraviolet protection or light polarizing layer 415) is placed beneath one of these windows 208. When the window 208 above the high-resolution display 101 is open, the high-resolution display 101 is visible to the user. When the window 208 above the high-resolution display 101 is closed, the user is unable to see the high-resolution display 101.

The segmented optical shutter 200 includes photospacers disposed in a quasi-random arrangement. Any of the arrangements illustrated in FIG. 3, or combinations thereof, may be used. The segmented optical shutter 200 uses electrodes placed along its substrates to open and close "windows," thereby transforming the window from a first, opaque state to a second, pellucid state.

Each of the individual windows of the segmented optical shutter 200 may be controlled independently. Further, by configuring the electrodes on one side of the segmented optical shutter 200, each shutter can be configured as the alphanumeric indicia, which may include numbers, letters, symbols, or brand information.

The dynamic user interface 400 may further include many elements or layers, such as a cover layer 402, a capacitive sensor 403, a segmented electroluminescent device 405, a resistive switch layer 406, a substrate layer 407, filler materials 410 and a tactile feedback layer 408. Many of these optional layers are described in detail in copending, commonly assigned U.S. application Ser. No. 11/684,454, entitled "Multimodal Adaptive User Interface for a Portable Electronic Device," which is incorporated herein by reference.

The cover layer 402 is a thin film sheet that serves as a unitary fascia member for the dynamic user interface 400. The cover layer 402, in one exemplary embodiment, is a thin, flexible membrane. Suitable materials for manufacturing the thin, flexible membrane include clear or translucent plastic film, such as 0.4 millimeter, clear polycarbonate film. In another embodiment, the cover layer 402 is manufactured from a thin sheet of reinforced glass. The cover layer 402 may include printing or graphics.

A capacitive sensor 403 is disposed below the cover layer 402. The capacitive sensor 403, which is formed by depositing small capacitive plate electrodes on a substrate, is configured to detect the presence of an object, such as a user's finger, near to or touching the dynamic user interface 400. Control circuitry (not shown) detects a change in the capacitance of a particular plate combination on the capacitive sensor 403. The capacitive sensor 403 may be used in a general mode, for instance to detect the general proximate position of an object, or may also be used in a specific mode, where a particular capacitor plate pair may be detected to detect the location of an object along length and width of the dynamic user interface (400).

A segmented electroluminescent device 405 includes segments that operate as individually controllable light elements. These segments of the segmented electroluminescent device 405 may be included to provide a backlighting function. In one embodiment, the segmented electroluminescent device 405 includes a layer of backlight material sandwiched between a transparent substrate bearing transparent electrodes on the top and bottom.

The resistive switch layer 406 serves as a force switch array configured to detect contact with any of one of the shutters dynamic keypad region or any of the plurality of actuation targets. When contact is made with the dynamic user interface 400, impedance changes of any of the switches may be detected. The array of switches may be any of resistance sensing switches, membrane switches, force-sensing switches such as piezoelectric switches, or other equivalent types of technology.

A substrate layer 407 can be provided to carry the various control circuits and drivers for the layers of the display. The substrate layer 407, which may be either a rigid layer such as FR4 printed wiring board or a flexible layer such as copper traces printed on a flexible material such as Kapton®, can include electrical components, integrated circuits, processors, and associated circuitry to control the operation of the display.

To provide tactile feedback, an optional tactile feedback layer 408 may be included. The tactile feedback layer 408 may include a transducer configured to provide a sensory feedback when a switch on the resistive switch layer detects actuation of a key. In one embodiment, the transducer is a piezoelectric transducer configured to apply a mechanical "pop" to the dynamic user interface 400 that is strong enough to be detected by the user.

Figure 5:
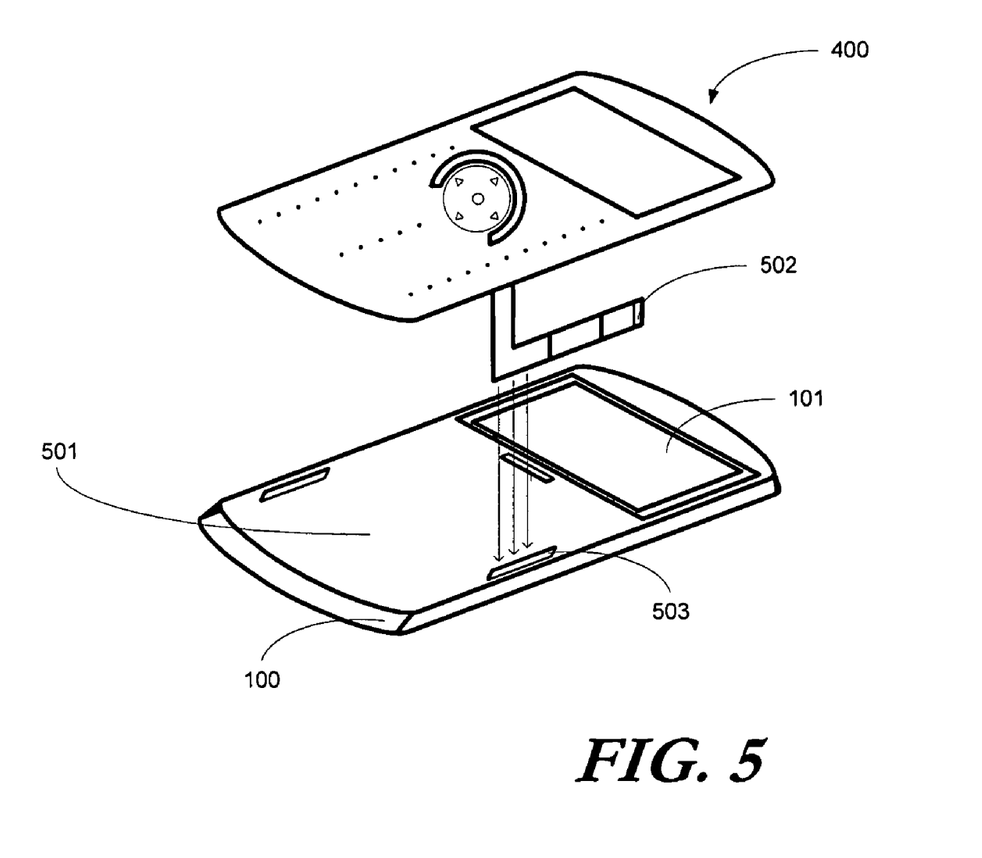
FIG. 5 illustrates an exploded view of an electronic device in accordance with embodiments of the invention.

Turning now to FIG. 5, illustrated therein is the dynamic user interface 400 being coupled to an electronic device body 501 to form the portable electronic device 100. From this exploded view, the high-resolution display 101, which may have a layer of clear, non-conductive adhesive disposed thereon, can be seen. The high-resolution display 101 sits beneath the segmented optical shutter (200). A connector 502 fits within a connector receptacle 502 of the electronic device body 501, thereby permitting an electrical connection between the dynamic user interface 400 and the other components and circuits of the portable electronic device 100.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited.

Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A field effect mode electro-optical device comprising a liquid crystal layer defining a black matrix disposed between a pair of transparent substrates and at least one light polarizer layer, wherein one or more substrates comprise a plurality of photospacers disposed in a quasi-random arrangement thereon configured to reduce a correlation function for transmitted light occurring between the plurality of photospacers and the black matrix.

2. The field effect mode electro-optical device of claim 1, wherein the liquid crystal layer comprises a twisted nematic liquid crystal layer.

3. The field effect mode electro-optical device of claim 1, wherein the quasi-random arrangement comprises an arrangement having varying horizontal and vertical distances between each photospacer.

4. The field effect mode electro-optical device of claim 3, wherein the varying horizontal and vertical distances depend from a random number generated within a predetermined variable range.

5. The field effect mode electro-optical device of claim 1, wherein the quasi-random arrangement comprises a repeating arrangement of at least one asymmetrical subsection of the plurality of photospacers.

6. A user interface for an electronic device, comprising:
a segmented optical shutter configured to selectively transition segments from an opaque state to a pellucid state; and
a pixilated, thin film transistor device configured to selectively present graphical indicia through at least one segment of the segmented optical shutter when the at least one segment of the segmented optical shutter is in the pellucid state;
wherein the segmented optical shutter comprises a liquid crystal layer disposed between two substrates that are separated by a plurality of photospacers disposed so as to reduce periodic spatial optical interference occurring between the plurality of photospacers and thin film transistor elements of the pixilated, thin film transistor device.

7. The user interface of claim 6, wherein the plurality of photospacers are disposed in a quasi-random arrangement.

8. The user interface of claim 7, wherein the quasi-random arrangement comprises a repetition of triangular orientations of photospacers.

9. The user interface of claim 8, wherein at least some of the triangular orientations differing in height and width from at least some others of the triangular orientations.

10. The user interface of claim 7, wherein the quasi-random arrangement comprises locating at least some of the plurality of photospacers apart from at least some others of the plurality of photospacers horizontally and vertically along a substrate by a random percentage.

11. The user interface of claim 10, wherein the random percentage is selected from a predetermined range, wherein the predetermined range is configured such that no photospacers overlap.

12. The user interface of claim 6, further comprising a capacitive sensor configured to detect a proximate position of an object relative to the user interface.

13. The user interface of claim 6, wherein at least some of the plurality of photospacers have a cross sectional area that is different from at least some others of the plurality of photospacers.

14. The user interface of claim 6, wherein at least some of the plurality of photospacers have a cross sectional shape that is different from at least some others of the plurality of photospacers.

15. The user interface of claim 6, wherein the plurality of photospacers are disposed so as to reduce a correlation function for transmitted light occurring between the plurality of photospacers and the thin film transistor elements within the segments.

16. The user interface of claim 6, wherein the periodic spatial optical interference comprises a moiré pattern.

17. The user interface of claim 6, wherein the pixilated, thin film transistor device comprises a black matrix, further wherein quasi-random arrangement comprises an arrangement sufficiently uncorrelated with the black matrix as to eliminate humanly perceptible optical interference between the plurality of photospacers and the black matrix.

18. An electronic device having a user interface comprising a segmented optical shutter and a high-resolution display configured as a dynamic user interface, wherein the segmented optical shutter comprises a liquid crystal material disposed between a pair of substrates and a black matrix, wherein at least one substrate has a plurality of photospacers disposed thereon in a quasi-random arrangement, wherein the quasi-random arrangement comprises misaligning the plurality of photospacers relative to the black matrix.

19. The electronic device of claim 18, wherein the dynamic user interface is selectively controllable and is configured so as to selectively hide and reveal the high-resolution display.

* * * * *